United States Patent [19]

Simmons et al.

[11] 4,082,381

[45] Apr. 4, 1978

[54] LUBRICATED BEARING ASSEMBLY

[75] Inventors: Frank B. Simmons, Lyndhurst; Alex Bozsvai, Solon; Louis A. Kovacs, Ashtabula; Robert P. Gerbetz, Euclid, all of Ohio

[73] Assignee: Reliance Electric Company, Cleveland, Ohio

[21] Appl. No.: 726,121

[22] Filed: Sep. 24, 1976

[51] Int. Cl.[2] ............................................. F16C 1/24
[52] U.S. Cl. .................................................. 308/187
[58] Field of Search ................... 308/78, 84, 106–110, 308/117–119, 187

[56] References Cited

U.S. PATENT DOCUMENTS

| | | | |
|---|---|---|---|
| 1,173,638 | 2/1916 | Baninger | 308/109 X |
| 2,770,506 | 11/1956 | Derner | 308/187 |
| 2,926,052 | 2/1960 | Cain | 308/187 |
| 2,959,457 | 11/1960 | Szymalak | 308/187 |
| 3,048,724 | 8/1962 | Mueller | 308/187 X |
| 3,811,743 | 5/1974 | Wren | 308/187 |

*Primary Examiner*—Duane A. Reger
*Attorney, Agent, or Firm*—Woodling, Krost, Granger & Rust

[57] ABSTRACT

A lubricated bearing assembly with rollable elements such as balls is disclosed. The rollable elements may be in a bearing cage and disposed between inner and outer races as in typical ball bearing unit. The inner race is secured to a rotatable shaft and the outer race is mounted in a frame of a machine. A first grease cavity is provided on one axial side of the rollable elements and a second grease cavity is provided on the opposite axial side of the rollable elements. The grease is introduced into one of the cavities, for example, the first cavity and is directed in an axial direction toward the rollable elements and to the spaces between such rollable elements to make sure that grease is provided in such spaces. The opposite grease cavity, for example, the second grease cavity, is provided with walls forming vanes in a radial direction. The action of the vane walls together with the revolution of the rollable elements during rotation of the shaft and inner race provide a small pumping action to locally pressurize the grease and force it from the second cavity through the spaces between the rollable elements into the first cavity. This provides positive greasing of the entire bearing assembly.

18 Claims, 6 Drawing Figures

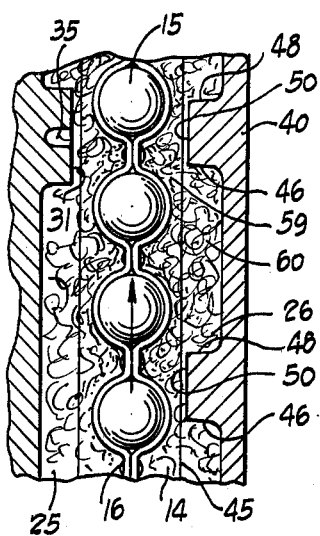

LUBRICATED BEARING ASSEMBLY

BACKGROUND OF THE INVENTION

A need has existed for many years for adequate and controlled greasing of rollable element bearings. Electric motors and other equipment operating at high rotational speeds accentuate this requirement because of operation at higher temperatures and loads which cause the grease to deteriorate more rapidly as well as to migrate out of the ball or roller track where it is needed. The trend in electric motor design is to use a smaller frame size for the same horse power or torque rating, which means higher operating temperatures and greater heat loss into the frame and into the bearing assembly. Also the trend is to use the smallest diameter bearing size that is possible to be used. These trends compound the problems for the requirements of adequate lubrication of the bearing assembly.

The prior art grease lubrication systems have failed to guarantee that fresh lubricant will be supplied onto the bearing raceway upon relubrication. The prior art greasing systems employed essentially a cylindrical cavity adjacent to the bearing unit, namely the rollable element such as balls, the cage for the balls, and the inner and outer races. This cylindrical cavity had a grease entry hole on the periphery of the cavity. The many problems that arose from this grease feed system where as follows:

1. The grease initially supplied into the cavity followed the path of least resistance. The grease might exit out a drain or along a cylindrical clearance around the shaft, at which point the operator usually stopped the regreasing because he saw the grease exiting and assumed the bearing was lubricated.
2. The lack of initial grease coverage of all metal surfaces allowed rusting or corrosion to occur during shipment and storage even before the motor or machine could be put into initial use. This was especially a problem with shielded bearings which have an annular shield on one side of the bearing unit, usually affixed to the outer race, and disposed between the balls and the grease cavity.
3. When the bearing was regreased, old oil-depleted grease base (soap) might be pushed into the bearing track and new grease might go only to the rear of the grease cavity.
4. Upon regreasing the bearing unit, the new grease might flow behind old caked grease and out along the shaft with absolutely no grease being provided into the bearing unit and onto the inner and outer races.
5. The lack of an inner grease cavity or reservoir in many prior art bearing assemblies limited the mounting position of the motor or machine to one with a horizontal shaft only.

The solution to the problem is to provide a grease lubricated bearing assembly wherein the new grease is directed axially toward the space between the rollable elements and not merely radially into a grease cavity nor merely axially toward a race of the bearing unit. This assures that the new grease is supplied to the space between the inner and outer races so as to relubricate the raceways and rollable elements. Grease cavities are provided on each axial side of the bearing unit and one of these cavities is provided with vane walls establishing radially directed vanes disposed closely adjacent the plane of the races of the bearing. These vane walls in conjunction with the revolution of the balls or rollable elements provide a slight pumping action to pump grease from that cavity in which the vanes are contained through the bearing unit into the opposite grease cavity.

SUMMARY OF THE INVENTION

The invention may be incorporated in a lubricated bearing assembly comprising in combination, a machine frame having an outer raceway, a rotatable shaft having an inner raceway, a bearing having a plurality of rollable elements disposed between and in rolling engagement with said raceways, a first wall in said frame defining a first grease cavity on a first side of said bearing, a second wall in said frame defining a second grease cavity on the second side of said bearing, a grease inlet passageway in said frame leading from the exterior of said frame to one of said grease cavities, and means including vane walls in said second cavity and including the revolution of said rollable elements for pumping grease from second to said first cavity.

An object of the invention is to provide a lubricated bearing assembly which assures proper lubrication of a bearing unit having rollable elements and inner and outer raceways.

Another object of the invention is to provide a lubricated bearing assembly wherein the grease is directed from one grease cavity on one side of the bearing through the bearing and then is directed back again through the bearing to the first grease cavity.

Another object of the invention is to provide a lubricated bearing assembly wherein a slight pumping action is provided to move the grease through the bearing unit to offset the inherent migration of grease toward a larger diameter portion of the shaft journaled in the bearing.

Other objects and a fuller understanding of the invention may be had by referring to the following description and claims, taken in conjunction with the accompanying drawings.

BRIEF DESCRIPTION OF THE DRAWING

FIG. 4 is a sectional developed view taken generally along the line 4—4 of FIG. 2;

FIG. 5 is a vertical sectional view of a first modification; and

FIG. 6 is a vertical sectional view of a second modification.

DESCRIPTION OF THE PREFERRED EMBODIMENTS

Figure 3:
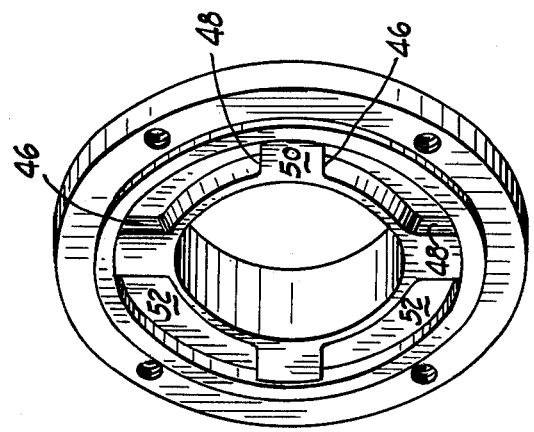
FIG. 3 is an isometric view of an inner bearing cap used on the machine frame of FIGS. 1 and 2.
Figure 2:
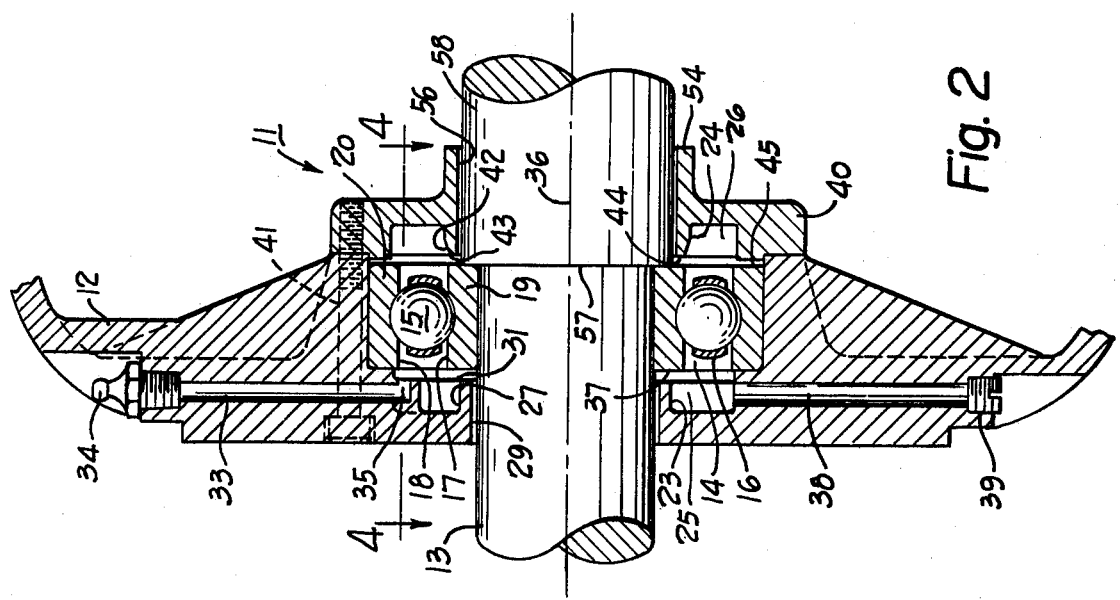
FIG. 2 is a vertical sectional view of a lubricated bearing assembly in accordance with the invention.
Figure 1:
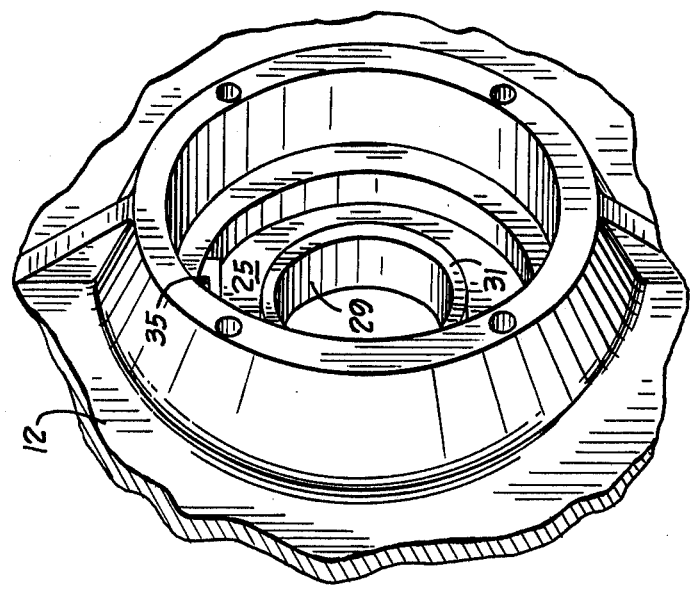
FIG. 1 is an isometric view of a machine frame to receive a bearing unit.

FIGS. 1, 2 and 3 illustrate a first embodiment of the invention of a lubricated bearing assembly 11 which includes a machine frame 12 and a rotatable shaft 13. The shaft is journaled in a bearing unit 14 which has rollable elements such as cylinders, needles, or truncated cones, but is shown as balls 15. These rollable elements 15 are usually kept spaced in a circumferential direction by a cage 16. The rollable elements roll on an inner raceway 17 and on an outer raceway 18. In the case of needle bearings, for example, the inner raceway may be a portion directly on the rotatable shaft 13 and the outer raceway may be a portion directly on the frame 12. However, in the case of any other types of bearing units 14, these inner and outer raceways 17 and 18 usually are provided on an inner race 19 and an outer race 20, as shown. The rollable elements are hereinafter referred to as balls but it will be understood that any form of rollable element as mentioned above may be used in the practice of the present invention. The inner race 19 is mounted on the shaft 13 by any suitable means such as being pressed on or a shrink fit on to this shaft. Also the outer race 20 is mounted in any suitable manner in the machine frame 12. In the embodiment shown in FIGS. 1, 2 and 3, the usual type of usage of the bearing unit 14 is provided namely with the outer race 20 stationary and the inner race 19 being the rotatable race yet it will be appreciated that these conditions may be reversed with a stationary inner race and shaft and a rotating outer race 20.

The machine frame 12 provides first and second walls 23 and 24, respectively, defining first and second grease cavities 25 and 26, respectively, on opposite sides of the bearing unit 14. In the embodiment shown these opposite sides are opposite axial sides.

The first wall 23 defines a sleeve 27 coaxial with the shaft 13 and this sleeve 27 has an inner bore 29 with a grease relief clearance relative to the shaft 13 to the exterior of the machine, at the left of FIG. 2. The first wall 23 terminates at planar walls 31 perpendicular to the shaft 13 and parallel to the outboard face 37 of the races 19 and 20. These planar walls 31 are preferably spaced approximately ⅛ to ¼ of an inch from the plane 37 of the outer face of the races 19 and 20 for bearing sizes of about 4 to 8 inches in outside diameter of the outer race 20.

A grease inlet passageway 33 is provided in the machine frame 12 leading from the exterior of this frame whereat a plug may be provided, or, as shown, a grease fitting 34 may be provided. The grease inlet passageway 33 extends to one of the cavities, in this case the first cavity 25. The inlet passageway 33 has a right angle bend for an exit opening 35 directed axially into the first cavity 25. Also this exit opening 35 is radially spaced from the axis 36 of the shaft so that the grease is directed toward the balls 15 and is directed to the space between the inner raceway 17 and the outer raceway 18.

An optional drain passageway 38 may be provided from the first cavity 25 at a location generally opposite the inlet passageway 33. This drain passageway may be open or optionally may be closed by a plug 39, such as a pressure relief plug.

The second wall 24 is provided in a bearing cap 40 separate from the machine frame but secured thereto as by machine screws 41 in order to be able to assemble the bearing assembly 11.

The second wall 24 defining the second grease cavity 26 defines a sleeve 42, and at least the portion of this sleeve which is adjacent the inner race 19 is preferably conically tapered so that the circular edge 43 thereof at a planar wall 44 is no larger in radial dimension than that of the inner raceway 17.

The second or inboard cavity 26 is also provided with vane or lands walls 46 and 48 establishing vanes 50 extending in a radial direction. Preferably a plurality of vanes 50 are provided in the second cavity 26 to separate the cavity into a plurality of separate grease chambers 52. The planar wall 44 of the lands 50 is preferably ⅛ of an inch or less from the plane of the adjacent surface 45 of the inner race 19, for bearing units in the range of 4 to 8 inches outside diameter. The bearing cap 40 has a hub 54 with an inner bore 56 of a length of about ½ to 1½ inches, the longer length being preferred to prevent grease leakage into the interior of the machine. The shaft 13 has a shoulder 57 and a larger diameter portion 58 on the interior of the machine. The inboard planar surface 45 of the inner race 19 abuts or is closely adjacent the shoulder 57 for positioning of the shaft 13 relative to the machine frame 12. The inner bore 56 is coaxial with the enlarged shaft portion 58 and has a small radial clearance therewith in the order of 0.004 to 0.012 inches.

OPERATION

Grease may be injected into the cavities 25 and 26 in the usual manner by using a grease gun applied to the fitting 34. Grease will enter the first cavity 25 through the right angle exit opening 35 and be directed toward the rollable elements 15 and the space between such elements. The cavities may be greased when the machine is stationary or rotating and in either event the grease tends to fill both cavities 25 and 26 as well as the space between the inner and outer races 19 and 20.

The prior art first used open bearing units, and later the prior art went to shielded bearing units with an annular shield on both sides of the bearing unit or at least on the one side from which the grease was supplied, the theory being that the shield prevented overlubrication of the bearing unit. It had been found that in some cases if the cavity as well as the spaces between the balls were completely packed with grease, then this was an overlubricated condition and there was much churning of the grease with no place for the excess grease to go. As a result the bearing unit overheated. In order to attempt to overcome this overlubrication, shields were used which closed off much of the space on the sides of the bearing unit and the hope was that overlubrication of such bearing unit could be averted.

In more recent years however, it has been found that many machines, such as electric motors, might be stored for some months before use. It has also been found that the initial lubrication of the bearing unit at the manufacturing facility for such bearing unit, has been less than perfect. Surfaces of the balls and the inner and outer raceways have been left without any protective lubrication film. As a result, the atmospheric conditions in usually unheated and changing humidity storage facilities often encouraged considerable corrosion within the bearing unit. Then when the machine or motor was finally put into service it quickly failed because of the improper lubrication and the corrosion already present within the bearing unit.

The present invention utilizes open bearing units rather than shielded bearing units in order to assure that the lubrication will be present not only in the first cavity 25 but also in the second cavity 26 and in the open spaces within the bearing unit 14; namely, the circumferential spaces between the balls 15 and the radial spaces between the inner and outer raceways 17 and 18. To this end the exit opening 35 of the grease inlet passageway 33 is directed axially so that the grease is caused to move axially toward the bearing unit 14 and does so, not against the outer face of the outer race 20, but rather it moves axially toward the space between the inner and outer races 19 and 20. The radial spacing of the exit opening 35 is greater than that of the inner raceway 17 and less than that of the outer raceway 18.

FIG. 4 shows a developed view of the grease cavities 25 and 26 and bearing unit 14, generally along the section line 4—4 of FIG. 2. This FIG. 4 shows the cage 16 for the balls which is not mandatory but is customarily used. This view also illustrates that there is a considerably amount of space between the individual balls 15 in a circumferential direction and this view together with FIG. 2 illustrate that there is a considerable amount of space for grease between the inner and outer raceways 17 and 18. The planar wall 31 of the grease cavity 25 is spaced from the planar wall 37 of the outboard plane of the bearing unit 14 by approximately ⅛ to ¼ of an inch. This assures that some of the grease will enter the first cavity 25 whereas much of the grease will be directed to the interior space within the bearing unit 14. Such grease will also be directed on through the bearing unit 14 into the second cavity 26. When greasing the bearing assembly, the plug 39, if present, would be removed in order to allow excess grease to be relieved. When lubricant begins to appear at the drain passageway 38 or also begins to appear along the shaft 13 at the inner bore 29, then the bearing assembly is adequately lubricated. Preferably a measured amount of grease should be charged into the bearing assembly at the time of lubrication, which amount is about 30 to 70 percent of the total volume available inside the two grease cavities and the bearing unit 14.

When the shaft 13 is rotated, a novel feature of the present invention occurs. Assume that the face of the shaft viewed in FIG. 2 moves upwardly during rotation, then in FIG. 4 the balls 15 will revolve upwardly as viewed in FIG. 4 at about one half the speed of the inner race 19. The combination of the revolving movement of the balls 15 plus the vane walls 46 creates a pinching or compression of the grease 60 in the area designated at 59 and thus creates a slight pumping effect to locally pressurize and mix or move the grease 60 from the second cavity 26 through the bearing unit 14 to the first cavity 25. This slight pumping or pressure from the inboard side through the bearing unit to the outboard side or outboard cavity 25 offsets the inherent inward hydraulic pressure which causes migration of the lubricant inwardly along the shaft 13. It is understood that this inherent inward hydraulic pressure is created by the difference in diameter between the small diameter outer portion 13 and the larger diameter inner portion 58. This is apparently due to the higher surface speed of the larger diameter portion 58. In any event it has been observed that there is a definite migration of lubricant film inwardly along the inner raceway 17 and it attempts to move inwardly along the space between the enlarged shaft portion 58 and the inner bore 56 of the hub 54. The present invention minimizes such leakage of lubricant to the internal parts of the machine by spacing the planar wall 44 of the sleeve 42 and lands 50 closely adjacent the planar wall 45 of the inboard side of the bearing unit 14. Preferably this is an eighth of an inch or less for bearing sizes of 4 to 8 inches outside diameter. Another feature of the invention is that the sleeve wall 42 is partially conical so that the diameter at the circular edge 43 is equal to or less than the diameter of the inner raceway 17. This has been found to minimize lubricant leakage inwardly along the shaft portion 58 because migration of such lubrication then travels along the inner raceway 17 and then along the conical wall of the sleeve 42 rather than along the shaft portion 58.

In the slight pumping action from the inboard cavity 26 toward the outboard cavity 25, the vane walls 46 contribute primarily to this pumping action but the circumferential dimension of the vanes or lands 50 also contributes to this pumping action by maintaining the compression or pressure on the grease 60 for a finite period of time. Of course if the shaft 13 is rotated in the opposite direction, then the vane walls 48 together with the revolution of the balls 15 would establish the slight pumping action. The circumferential width of the vanes or lands 50 may be in the order of ½ inch to 1 inch and the spacing between the lands is preferably at least four times the width of each land. The axial depth of the individual grease cavities 25 and 26 may by any suitable dimension to hold the amount of grease desired.

After many hours of operation of the machine the grease will become caked and so called "soap" will be formed which is the caked residue of the grease from which the oil has been extracted. This caked residue of the grease is the definite problem overcome during relubrication by the present bearing assembly. The prior art forms of bearing assemblies often had the grease inlet passageway 33 directed radially into a cavity. If grease were caked along the outboard side 37 of the bearing unit 14, especially a shielded bearing, then often the grease went from the inlet passageway directly out along the space between the shaft 13 and the inner bore 29. Many operators, upon seeing grease exiting at this point would immediately stop pumping grease into the cavity, assuming that the bearing assembly had been properly relubricated. Tests with two different colored greases and transparent housings to form the two grease cavities have readily demonstrated this to be the case. The present invention overcomes this lack of proper relubrication by directing the grease axially toward the space between the rollable elements 15 within the bearing unit 14, by omitting the shield on the bearing unit 14, and by providing the vane walls 46 to give a slight pumping action to move the lubricant from the grease cavity 26 back through the bearing unit 14 and into the first grease cavity 25. This together with the inherent migration of lubricant inwardly effectively moves the lubrication within the bearing assembly so that it is properly lubricated and may be properly relubricated despite any caking of the grease or formation of "soap." Again, preferably a measured amount of grease should be added to the bearing assembly 11 during relubrication, rather than relying upon visual evidence of grease exiting at the inner bore 29 or exiting at the drain passageway 38.

FIG. 5 illustrates a modified bearing assembly 61 provided in a machine frame 62 which again journals the shaft 13 in a bearing unit 14. In this embodiment the first wall 63 defining the first grease cavity 65 is provided in an outer bearing cap 67. The second wall 64 defining the second grease cavity 66 is provided in the machine frame 62. The second grease cavity 66 is provided with the lands 50 to provide the slight pumping action from the inboard grease cavity 66 toward the outboard grease cavity 65. The machine frame 62 is provided with a grease inlet passageway 69 which has an axially directed exit opening 70 into the second cavity 66. This directs grease into the bearing unit 14 as well as into the grease cavity 66. The outboard cavity 65 in the outer bearing cap 67 is optionally provided with a drain passage 72 which in turn is provided with a pressure release type of drain cap 73. Also the outer bearing cap 67 is provided with an inner bore 74 having a clearance relative to the shaft 13 which may be in the order of 0.020 to 0.030 inches as a radial dimension. This will provide a grease relief channel in case of attempts to overlubricate the bearing assembly 61. This bearing assembly is shown as being provided with a lock nut 76 engaging a thread 77 on the shaft 13 and held in place by a lock ring 78. This lock nut 76 positively locates the bearing unit 14 against the shaft shoulder 57. Such lock nut 76 may be provided in the bearing assembly 11 of FIG. 2, if desired.

FIG. 6 illustrates another embodiment of the invention in a bearing assembly 81 which includes a machine frame 82. Such frame may have a C face mounting shoulder 83 as a register fit on which to mount various apparatuses to the machine or motor having the frame 82. Where the machine frame 82 is a part of an electric motor, for example, then one may wish to mount a brake or clutch or some other load on the frame 82 at the register fit shoulder 83. In such case it is usually desired that no grease leakage occur along the shaft 13 and accordingly the frame 82 is provided with one or more seals such as a V type grease seal 84. A large drain passageway 85 and grease vent plug 86 is provided to prevent overlubrication of the bearing unit 14. In other respects the machine frame 82 may be quite similar to frame 12 shown in FIG. 2.

Each of the lubricated bearing assemblies 11, 61 and 81 provide grease entry into the grease cavity along an axially directed passageway so that the grease is directed at the bearing unit 14. Also each provides vane means to provide a slight pumping action to move the grease from one cavity toward the other. This has been shown as movement from the inboard cavity 26 or 66 toward the outboard cavity 25 or 65. This offsets the inherent movement or migration of lubricant film from the outboard cavity toward the inboard cavity which is apparently caused by the higher surface speed at the larger shaft diameter portion 58. By this means relubrication of the bearing is assured in a much more positive manner despite any caking of the grease.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A lubricated bearing assembly comprising in combination,
   a machine frame having an outer raceway,
   a rotatable shaft having an inner raceway,
   a bearing having a plurality of rollable elements disposed between and in rolling engagement with said raceways,
   a first wall in said frame defining a first grease cavity on a first side of said bearing,
   a second wall in said frame defining a second grease cavity on the second side of said bearing,
   said first grease cavity being outboard of said second grease cavity in said machine frame,
   a grease inlet passageway in said frame leading from the exterior of said frame to one of said grease cavities,
   and means including vane walls defining vanes in said second cavity and including the revolution of said rollable elements for locally pressuring the grease at said vanes to move grease from said second to said first cavity.

2. A bearing assembly as set forth in claim 1 wherein said last mentioned means includes at least one land defined by said vane walls and extending in a radial direction in said second grease cavity.

3. A bearing assembly as set forth in claim 1 wherein said last mentioned means includes at least two lands defined by said vane walls and extending in a radial direction and dividing said second grease cavity into substantially separate grease chambers.

4. A bearing assembly as set forth in claim 1 wherein said rollable elements are balls, said inner raceway is provided on an inner race separate from said shaft, and said outer raceway is provided on an outer race separate from said machine frame.

5. A bearing assembly as set forth in claim 1 and including a grease outlet communicating with said first cavity at a position generally circumferentially opposite said inlet passageway.

6. A bearing assembly as set forth in claim 1 wherein said inlet passageway directs grease generally axially toward said rollable elements and has an inlet to said first cavity at a radial dimension substantially the same as that of said rollable elements.

7. A bearing assembly as set forth in claim 6 wherein said outer raceway is provided on an outer race separate from said machine frame, and said grease inlet passageway extends into said first cavity to have an exit for the grease thereinto spaced in the order of 0.125 to 0.250 inches from the plane of said outer race.

8. A bearing assembly as set forth in claim 6 wherein said first wall defines a sleeve closely surrounding said shaft and having a radial clearance therewith in the order of 0.020 inches to 0.030 inches.

9. A bearing assembly as set forth in claim 1 wherein said second wall defines a sleeve closely spaced and coaxial relative to said shaft.

10. A bearing assembly as set forth in claim 9 wherein said sleeve has a radial clearance with said shaft in the order of 0.004 inches to 0.012 inches.

11. A bearing assembly as set forth in claim 9 wherein said sleeve has an axial length along said shaft in the order of ½ to 1½ inches.

12. A bearing assembly as set forth in claim 1 including an inner race separate from said shaft and providing said inner raceway, and a shoulder on said shaft closely abutting said inner race.

13. A bearing assembly as set forth in claim 12 wherein said sleeve has a conically tapered edge directed toward said inner race.

14. A bearing assembly as set forth in claim 12, wherein said shoulder is part of migration means and is adjacent said second cavity to cause a small migration of grease from said first to said second cavity.

15. A bearing assembly as set forth in claim 1, including migration means including a shoulder connected to and rotating with said shaft adjacent said second cavity and being larger in diameter than said shaft adjacent said first cavity to cause a small flow of lubricant from said first to said second cavity.

16. A bearing assembly as set forth in claim 2, wherein said land is substantially perpendicular to the shaft axis and has a circumferential dimension of from ½ to 1 inch.

17. A bearing assembly as set forth in claim 1, including an inner race separate from said shaft and providing said inner raceway, said inner race having a planar face adjacent said second cavity, and at least one land defined by said vane walls and lying in a plane within one-eighth inch of said planar face of said inner race.

18. A bearing assembly as set forth in claim 1, wherein said lands extend completely across said second cavity.

* * * * *